United States Patent Office 3,502,605
Patented Mar. 24, 1970

3,502,605
ADHESIVE COMPOSITION FOR WOOD
AND METAL
Trevor P. Clark, 3650 Sunnycrest Drive, North Vancouver, British Columbia, Canada, and Paul C. Trussell, 7407 Granville St., Vancouver, British Columbia, Canada
No Drawing. Continuation-in-part of application Ser. No. 425,693, Jan. 13, 1965. This application Nov. 13, 1967, Ser. No. 682,605
Int. Cl. C08d 7/06, 7/08
U.S. Cl. 260—29.7       27 Claims

ABSTRACT OF THE DISCLOSURE

An adhesive composition which readily and strongly bonds to wet and dry solid surfaces in and out of water to protect the surfaces against attack by biological, chemical and physical agents, and withstands temperature changes, vibratory shock, direct impact and abrasion, said composition comprising by weight cationic polymerized chloroprene emulsion from about 20 to about 60%, hydraulic cement from about 4 to about 40%, and an inert, short fibre material from about 1 to 45%.

---

This is a continuation of application Ser. No. 425,693, filed Jan. 13, 1965, and now abandoned.

This invention relates to adhesive compositions particularly for use as coatings which can be applied to any solid surface so as to provide protection against damage or loss, but can be used for other purposes as well.

The adhesive composition according to the present invention when used as a coating readily bonds to wood, and will protect the underlying wood against attack by biological, chemical and physical agents, such as wood-boring insects, wood-boring mollusks and crustaceans that exist in the sea, wood damaging chemicals, buffeting, shock and abrasion. It will adhere readily to metal and protect it from the same agents and particularly from natural corrosive elements that exist in the air or in the sea.

One feature of the present composition is that it may be applied to wet or dry surfaces in the air, or to surfaces under water, either fresh water or seawater. In all cases the composition adheres to the surfaces and cures to form a firm coating. The composition can also be used to stick wooden and/or metal articles together and as a patching composition in air or in water.

Another advantage of this adhesive composition is that it has high cohesive properties so that it does not crack when exposed to changes in ambient temperature, vibratory shock, or direct impact, and has sufficient flexibility to accommodate normal variations caused by bending moment to the substratum or expansion and contraction changes of the substratum caused by thermal variation.

Another advantage of the present adhesive material is that the curing or setting time can be adjusted within one to three hours, so that large quantities can be made up at one time when large areas are to be coated.

The composition can be applied manually by trowelling or mechanically by use of an applicator to wood, metal, plastic, rock and cement surfaces in the air or under water. No forms are required to keep the coating material in place until it hardens or cures. In fresh water or sea water the adhesive material exhibits remarkable cohesive properties so that it does not disperse, adheres well to wood, metal or other surfaces and sets to a similar firmness as if applied to said surfaces in air.

Another advantage of this composition is its resilient characteristic, which permits resistance to severe mechanical impact, and resistance to mechanical abrasion. This resilient property is also a protection to materials coming quickly into contact with hard surfaces which have been coated. For example, articles suspended into the sea striking against the steel piling of oil-drilling rigs.

Destruction of wood and corrosion of metal in the sea are problems of universal significance. In the underwater zone, and in the inter-tidal zone, wood is attacked by both teredine and limnorial borers. Even wood which has been treated by creosote impregnation before placing in sea water can be attacked by creosote-resistant Limnoria, and these borers can completely destroy a wooden piling in eight years or less. This problem is one of increasing concern to maritime industries throughout the world which have heavy investments in wooden structures. It is becoming of particular concern in some of the larger sea ports of the world, such as San Francisco and San Pedro, where creosote-resistant Limnoria have become exceedingly destructive since the introduction of pollution control measures.

The protection of steel structures exposed to the sea has been an extremely difficult problem to combat. Although cathodic protection will protect those portions of a steel structure continuously under water, little or no protection is afforded for those portions periodically wetted in the inter-tidal area or in the area commonly referred to as the "splash zone'" Furthermore, the application of conventional paints or coatings to steel in the splash zone is of little value since they are not suitable for application on wet surfaces. Although conventional paints and coatings may be applied to metal before it is placed in sea water, the expected life of the steel far exceeds that of the coatings, so that a coating which can be applied to wet metal surface is of very widespread industrial value.

Although the adhesive composition according to the present invention has extensive maritime applications in the protection of wood and metal, it is also of value in the coating of wood interrestial environments, where exposure to destructive insects, such as termites, is a problem.

As this adhesive composition is mainly used for coating and protective purposes, it will be so described herein.

The present composition is comprised of four major fractions: a cationic polymerized chloroprene emulsion from about 20 to 60% by weight when adjusted to 49 to 51% by weight of solids content, a hydraulic cement from about 4 to 40% by weight, an inert short fibre material, such as asbestos fibres from about 1 to 45% by weight and preferably sand up to about 60%, although sand can be omitted. If the sand is omitted, the cement and asbestos together preferably range from about 40 to 80%. These fractions may be combined in a variety of proportions to give coatings of different characteristics, some particularly suitable for application under water but usable in air as well, some for application only in air. If desired, compatible accelerators, anti-oxidants and bulking agents may be included. Some of the combinations suitable for underwater application are shown below.

Combination A is preferred to B or C for resistance to tear and shear and is ideal for applications under reasonably quiescent water conditions. Combination B has superior trowelling characteristics to application A and is the most suitable of the three combinations cited for application to steel. It may also be used for application to wood where a smooth, economical coating is desired.

Combination C which contains more cement and asbestos fibres and less sand than combinations A or B, produces a mixture with very strong cohesive properties and with excellent trowelling characteristics during application. It resists the efforts of very strong water currents while being applied but has less resistance to tear and shear than to combinations A and B.

|  | A | B | C |
|---|---|---|---|
| Polymerized chloroprene emulsion | 29.0 | 32.4 | 40.0 |
| Cement (hydraulic) | 15.5 | 19.6 | 26.2 |
| Asbestos fibres | 3.9 | 5.0 | 6.6 |
| Silica sand | 51.0 | 42.3 | 26.1 |
| Sulfur | 0.1 | 0.1 | 0.2 |
| Cupic hydroxide | 0.3 | 0.4 | 0.6 |
| Diphenylamine | 0.2 | 0.2 | 0.3 |

For underwater applications, the proportion of the four components, polymerized chloroprene emulsion, cement, fibres and sand, depends on the formation of a wet, dense mass which holds together under water and can be spread over the surface to be treated. For the particular chloroprene emulsion used herein about 40% by weight of the emulsion forms a mass of suitable texture for underwater application when combined with about 26% hydraulic cement, 6.6% asbestos fibres and about 26% sand. When sand is included in the formulation, the dry ingredients, the cement, fibres and sand, must be increased somewhat in proportion to the amount of the liquid ingredient, the chloroprene emulsion. Thus, when the sand is increased from 26 to 42%, as in combination B above, the percentage of this particular chloroprene emulsion in the formulation drops to 32.5; when the percentage sand is increased to 51%, as in combination A above, the percentage of chloroprene emulsion drops to 29.0.

For combinations of ingredients for underwater applications, on vertical as well as horizontal surfaces, when sand is not included in the mixture, the chloroprene preferably ranges from 24 to 50% and the hydraulic cement and asbestos fibres together from 76 down to 50%.

For combinations including sand, the polymerized chloroprene emulsion, the cement, the fibres and the sand can be combined in various proportions to form a mass suitable for underwater coating. In different combinations of the four ingredients, the range of the chloroprene preferably extends between 20 and 50%, the cement between 10 and 40%, the asbestos fibres between 5 and 45% and the sand up to 60%. However, the ratio of the four ingredients, one to another, is preferably determined from within these ranges to obtain the coating material of desirable properties.

For application on dry and wet surfaces in air, the range of the main ingredients for suitable coatings is much wider. The chloroprene emulsion may be used in the range of 20 to 60% of the composition, the cement from 4 to 40%, the inert fibres from 1 to 45% and the sand in the range from 0 to 60%. Again, the ratio of the four ingredients, one to another, is preferably determined from within these ranges to obtain the coating material of desirable properties.

Minor constituents, such as sulfur, cupric hydroxide and diphenylamine, although not essential for the setting of the coating, can be used to improve the properties of the coating. The percentages of each of the constituents are variable within the limits desired of properties of the coatings, and substitution by other materials of the same class or group may be possible. For example, in place of the silica sand, talc or mica may be used.

The over-all ranges for each of the constituents as might be used for preparing coatings of different properties are as follows:

|  | Percent by weight |
|---|---|
| Polymerized chloroprene emulsion | 20–60 |
| Cement (hydraulic) | 4–40 |
| Asbestos fibres | 1–45 |
| Silica sand, talc or mica | Up to 60 |
| Sulfur | 0.1–1.0 |
| Cupric hydroxide | 0.1–4 |
| Diphenylamine | 0.02–1.0 |

A number of types of hydraulic cements may be used. Portland cement, Type I, is very satisfactory but Types II, III and V can also be used. A low-alkali, aluminous type cement can be usde to obtain a quicker-setting coating. The purpose of the cement is to thicken the composition, bond it, and to absorb water from the chloroprene emulsion, causing it to form a film. The cement also increases the adhesion of the coating to metal when used in combination with chloroprene emulsion. The amount of cementitious material is from 4 to 40% by weight of the mixture.

Any suitable inert bulking material can be used, and preferably one that is resistant to abrasion. Fine silica sand, talc and/or mica are preferred.

The silica sand may be of graded type ranging from −325 mesh to about 30 mesh. It must be dry when incorporated into the mixture. The sand provides resistance to abrasion and is an inexpensive bulking agent. The talc or mica may be of graded sizes from −325 mesh to about 30 mesh. The amounts of these may vary between 0 and 60%. The purpose of these additives is to make the coatings more impervious to water, particularly during the initial setting period, so as to prevent loss of chloroprene by leaching.

Any inert, short fibre material that will interlace or mat can be used in the formulation. Asbestos fibres are ideal for this purpose. The asbestos or the like, together with the proportion of the components, is the key to providing cohesion of the product, and prevents dissipation of chloroprene emulsion and sand when the coating is being applied under water. Asbestos also produces high initial adhesion of the coating when applied to wood or metal under water, and assists in providing the high resistance of the coating to mechanical impact. The asbestos also promotes the long life of the coating through its inertness—its resistance to salts, acids and chemicals in general. Asbestos fines and/or asbestos shorts can be used. The fine asbestos desirably should have a fibre length between 0.02 and 0.07 inch and the asbestos shorts between 0.07 and 0.25 inch. For various types of coatings the asbestos may range between 1 and 45%, and if fines and shorts are used, they are usually in about equal proportions.

Sulfur can be added to accelerate the curing of the chloroprene so as to give higher physical strength and resistance to shear for the coating. The sulfur concentration in the coating can range between 0.02 to 1.0%. Sulfur compounds can be substituted for sulfur in the formulation.

The cupric hydroxide is of commercial grade and it is included to act on the surfactant in the chloroprene emulsion, causing the emulsion to be broken and the chloroprene to form a film, and thereby accelerating the setting of the coating. The cupric hydroxide in the formulation can range between 0.1 and 4%. Other divalent metal hydroxides or salts of the divalent metals can be used in place of the cupric hydroxide.

A compatible anti-oxidant can be used, particularly when the composition is to be applied to metal surfaces. Diphenylamine, commercial grade, is preferred as an anti-oxidant to resist corrosion of the metal. The concentration of this material can range between 0.02 and 1.0% in the formulation. Other amine-type anti-oxidants can be used, such as alpha naphthylamine.

The polymerized chloroprene emulsion contains a cationic detergent, such as alkylated tolylmethyl trimethyl ammonium chloride to which is added 0.01 to 0.1%, preferably 0.03%, of an antifoam such as 30% solution of dimethyl polysiloxane-type silicone in a non-ionic emulsifier. The particular chloroprene emulsion used in determining the constituent of the composition was that produced by E. I. du Pont de Nemours Co. Inc. under the trademark "Neoprene Latex 950." This emulsion is produced by polymerizing acetylene to monovinylacetylene in the presence of cuprous chloride and hydrogen chloride then reacting with hydrogen chloride in the presence of cuprous chloride to form chloroprene. The chloroprene is purified by fractionation, emulsified in water, using the alkylated tolyl methyl trimethyl ammonium chloride as an emulsifying agent, and then polymerized with the aid of potassium persulfate catalyst. The solids content of the finished "Latex 950" is kept at 49 to 51% by weight.

It is to be understood, therefore, that in the specifications and claims reference to cationic chloroprene emulsions shall be deemed to mean chloroprene emulsions having the same or similar characteristics to "Neoprene Latex 950." It is to be further understood that proportionment of the components of the cement as indicated in the specification and claims, is based upon the use of a cationic emulsion in which the solids content is adjusted to 49 to 51% by weight. The chloroprene emulsion is used to give flexibility to the coating and resistance to impact and chemical attack. It also increases the adhesion of the coating to metal when used in combination with portland cement, and increases the resistance of the coating to chemical attack. The use of cationic polymerized chloroprene emulsions, rather than those of an anionic nature, permits application of the cement underwater.

Unstable anionic polymerized chloroprene emulsions are unsatisfactory or they coagulate immediately when mixed with portland cement due to the presence of calcium salts. Anionic chloroprene emulsion stabilized, for example, with ammonium caseinate, methocel or surface-active agents, when mixed with portland cement, have an extended setting time, and are therefore subject to dilution when applied underwater and set to soft, spongy, non-adherent masses.

On the other hand, cationic polymerized chloroprene emulsions can be mixed with portland cement to give a pot-life of an hour or more and as the reaction of the emulsion with the portland cement proceeds at a satisfactory rate, dilution thereof is prevented. The presence of anions in sea water accelerates setting of the mixture and setting in fresh water can be accelerated and controlled by the addition of amines which release anions into the mixture.

The cationic emulsions also enhance the adherent qualities of the cement when applied to wood underwater as the anionic fibres of the wood attract and congeal the emulsion resulting in a tight-bond.

A list of some combinations of the major constituents used in combination with three types of cement is shown below. These coatings are suitable for application to dry or wet surfaces in air or under water. However, the coatings of thin consistency are applicable in air only, but they can be immersed in water after setting.

COMBINATIONS OF MAJOR CONSTITUENTS AND DESCRIPTION OF COATINGS

| Type of cement | Chloroprene emulsion, percent | Hydraulic cement, percent | Asbestos fibres, percent | Sand, percent | Description of coating |
|---|---|---|---|---|---|
| Type I | 41.0 | 26.0 | 33.0 | 0 | Very thick, putty-like material. Trowels very smoothly under water. Sets to fairly tough, flexible coating in air. |
| Type V | 41.0 | 26.0 | 33.0 | 0 | |
| Type I | 48.5 | 22.5 | 6.5 | 22.5 | Very thick, smooty, putty-like material. Does not work well under water. Sets in air to flexible, rubbery coating. |
| Type V | 48.5 | 22.5 | 6.5 | 22.5 | |
| Type I | 40.0 | 12.0 | 30.0 | 18.0 | Very thick, smooth, putty-like material. Trowels very smoothly under water. Sets in air to smooth, fairly tough, flexible coating. |
| Type V | 40.0 | 12.0 | 30.3 | 18.0 | |
| Type I | 24.0 | 33.8 | 8.4 | 33.8 | Heavy, putty-like consistency. Trowels smoothly. Sets to very firm, rubbery mass. |
| Do | 60.0 | 17.8 | 4.4 | 17.8 | Paint-like consistency; must be stirred during application. Sets to rubber-like coating. |
| Type V | 24.0 | 33.8 | 8.4 | 33.8 | Very heavy, putty-like consistency. Must be used immediately after mixing. Sets to very firm, rubbery mass. |
| Do | 60.0 | 17.8 | 4.4 | 17.8 | Paint-like consistency; must be stirred during application. Sets to rubber-like coating. |
| Aluminous | 31.0 | 30.7 | 7.6 | 30.7 | Very heavy, putty-like consistency. Sets to very firm, rubber-like mass. |
| Do | 60.0 | 17.8 | 4.4 | 17.8 | Paint-like consistency. Sets to rubber-like coating. Must be stirred during application. |
| Type I | 20.0 | 23.6 | 5.8 | 50.6 | Very thick, putty-like consistency. Sets to a very firm rubber-like mass. |
| Do | 60.0 | 12.0 | 3.0 | 25.0 | Paint-like consistency. Sets to rubber-like coating. Must be stirred during application. |
| Type V | 20.0 | 23.6 | 5.8 | 50.6 | Very thick, putty-like consistancy. Sets to very firm, rubber-like mass. |
| Do | 60.0 | 12.0 | 3.0 | 25.0 | Paint-like consistency. Sets to rubber-like coating. Must be strired during application. |
| Aluminous | 26.0 | 21.8 | 5.4 | 46.8 | Very thick, putty-like consistency. Sets to a firm, rubber-like mass. |
| Do | 60.0 | 12.0 | 3.0 | 25.0 | Paint-like consistency. Sets to a rubber-like coating. Must be stirred during application. |
| Type I | 20.0 | 17.8 | 4.4 | 57.8 | Very thick, putty-like consistency. Sets to very firm, rubber-like mass. |
| Do | 60.0 | 8.9 | 2.2 | 28.9 | Paint-like consistency. Sets to rubber-like coating. Must be stirred during application. |
| Type V | 20.0 | 17.8 | 4.4 | 57.8 | Very thick, putty-like consistency. Sets to very firm, rubber-like mass. |
| Do | 60.0 | 8.9 | 2.2 | 28.9 | Paint-like consistency. Sets to rubber-like coating. Must be stirred during application. |
| Aluminous | 26.0 | 16.4 | 4.2 | 53.4 | Very thick, putty-like consistency. Sets to very firm rubber-like mass. |
| Do | 60.0 | 8.9 | 2.2 | 28.9 | Paint-like consistency. Sets to rubber-like coating. Must be stirred during application. |

What we claim as our invention is:

1. An adhesive composition which readily and strongly bonds to wet and dry solid surfaces in and out of water to protect the surfaces against attack by biological, chemical and physical agents, and withstands temperature changes, vibratory shock, direct impact and abrasion, said composition comprising by weight cationic polymerized chloroprene emulsion from about 20 to about 60%, hydraulic cement from about 4 to about 40%, and an inert, short, fine fibre material ranging in length from 0.02 to 0.25 inch from about 1 to 45%.

2. An adhesive composition as claimed in claim 1 including sand up to about 60% by weight.

3. An adhesive composition as claimed in claim 1 including a divalent metal hydroxide about 0.1 to about 4% by weight.

4. An adhesive composition as claimed in claim 1 including a compatible anti-oxidant about 0.02 to about 1.0% by weight.

5. An adhesive composition as claimed in claim 1 including about 0.1 to about 1.0% sulfur by weight.

6. An adhesive composition as claimed in claim 2 including a divalent metal hydroxide about 0.1 to about 4% by weight.

7. An adhesive composition as claimed in claim 2 including a compatible anti-oxidant about 0.02 to about 1.0% by weight.

8. An adhesive composition as claimed in claim 2 including about 0.1 to about 1.0% sulfur by weight.

9. An adhesive composition as claimed in claim 3 including by weight a compatible anti-oxidant about 0.02 to about 1.0%, and about 0.1 to about 1.0% sulfur.

10. An adhesive composition as claimed in claim 9 including up to about 60% by weight of an inert bulking agent.

11. An adhesive composition as claimed in claim 1 in which said hydraulic cement is selected from the group consisting of Portland Cement Types I, II, III and V, and an aluminous-type cement; and said short fibre material is asbestos fibres.

12. An adhesive composition as claimed in claim 11 including up to about 60% by weight of an inert bulking agent selected from the group consisting of silica sand, talc and mica.

13. An adhesive composition as claimed in claim 11 including by weight about 0.1 to about 4% of an accelerator selected from the group consisting of divalent metal by dioxides and divalent metal salts.

14. An adhesive composition as claimed in claim 11 including by weight about 0.02 to about 1.0% of an amine-type anti-oxidant.

15. An adhesive composition as claimed in claim 11 including by weight about 0.1 to about 1% sulfur.

16. An adhesive composition as claimed in claim 13 including up to about 60% by weight of an inert bulking agent selected from the group consisting of silica sand, talc and mica.

17. An adhesive composition as claimed in claim 14 including up to about 60% by weight of an inert bulking agent selected from the group consisting of silica sand, talc and mica.

18. An adhesive composition which readily and strongly bonds to wet and dry solid surfaces in and out of water to protect the surfaces against attack by biological, chemical and physical agents, and withstands temperature changes, vibratory shock, direct impact and abrasion, said composition comprising by weight cationic polymerized chloroprene emulsion from about 24 to about 50%; about 10 to about 40% of a hydraulic cement selected from the group consisting of Portland Cement Types I, II, III, and V, and an aluminous-type cement; and about 5 to about 45% of short, fine asbestos fibres of a length ranging from 0.02 to 0.25 inch.

19. An adhesive composition as claimed in claim 15 including by weight about 0.1 to about 4% of an accelerator selected from the group consisting of divalent metal by dioxides and divalent metal salts.

20. An adhesive composition as claimed in claim 15 including by weight about 0.02 to about 1.0% of an amine-type anti-oxidant.

21. An adhesive composition as claimed in claim 15 including by weight about 0.1 to about 1.0% sulfur.

22. An adhesive composition which readily and strongly bonds to wet and dry solid surfaces in and out of water to protect the surfaces against attack by biological, chemical and physical agents, and withstands temperature changes, vibratory shock, direct impact and abrasion, said composition comprising by weight cationic polymerized chloroprene emulsion from about 20 to about 50%; up to about 60% of an inert bulking agent selected from the group consisting of silica sand, talc and mica; about 10 to about 40% of a hydraulic cement selected from the group consisting of Portland Cement Types I, II, III, and V, and an aluminous-type cement; and about 5 to about 45% of asbestos fibres of short, fine length ranging from 0.02 to 0.25 inch.

23. An adhesive composition as claimed in claim 22 including by weight about 0.1 to about 4% of an accelerator selected from the group consisting of divalent metal by dioxides and divalent metal salts.

24. An adhesive composition as claimed in claim 22 including by weight about 0.02 to about 1.0% of an amine-type anti-oxidant.

25. An adhesive composition as claimed in claim 22 including by weight about 0.1 to about 1.0% sulfur.

26. An adhesive composition which readily and strongly bonds to wet and dry surfaces in and out of water to protect the surfaces against attack by biological, chemical and physical agents, and withstands temperature changes, vibratory shock, direct impact and abrasion, said composition comprising by weight cationic polymerized chloroprene emulsion from about 20 to about 60%; about 4 to about 40% hydraulic cement selected from the group consisting of Portland Cement Types I, II, III and V, and a low alkali aluminous-type cement; about 2 to about 45% short, fine asbestos fibres of a length ranging from 0.02 to 0.25 inch; about 0.1 to about 1% of sulphur; about 0.1 to about 4% cupric hydroxide; and about 0.02 to about 1% of an anti-oxidant selected from the group consisting of diphenylamine and alpha naphthylamine.

27. An adhesive composition as claimed in claim 26 including up to 60% by weight of an inert bulking material selected from the group consisting of fine silica sand, talc and mica.

References Cited

UNITED STATES PATENTS 1,940,528 12/1933 Bond.
2,138,226 11/1938 Dales et al.
2,556,575 6/1951 Cubberley et al.

OTHER REFERENCES

Carl, J. C.: Neoprene Latex Del., E. I. du Pont de Nemours & Co. (1962), pp. 4 and 5, Ts 1925 C 25.

MURRAY TILLMAN, Primary Examiner

WILBERT J. BRIGGS, SR., Assistant Examiner

U.S. Cl. X.R.

117—122, 132, 148; 156—333; 260—41.5